Patented Aug. 31, 1926.

1,597,877

UNITED STATES PATENT OFFICE.

HARRY D. GIBBS, OF PENNS GROVE, AND ALFRED W. FRANCIS, OF CARNEYS POINT, NEW JERSEY, ASSIGNORS TO E. I. DU PONT DE NEMOURS & COMPANY, OF WILMINGTON, DELAWARE, A CORPORATION OF DELAWARE.

PROCESS OF MAKING CAMPHOR.

No Drawing.     Application filed November 23, 1920. Serial No. 426,036.

This invention relates to the production of camphor, and comprises inducing a reaction between iso-borneol and oxygen while the substances are in the vapor phase, the principal product of the reaction being camphor.

One object of our invention is to provide a continuous process for the production of camphor from iso-borneol. Other objects will be apparent in the following description.

It is well-known that iso-borneol can be oxidized to camphor in the liquid phase by certain substances, the most useful of these apparently being nitric acid.

It has also been proposed in U. S. Patent No. 801,485 to oxidize isoborneol in the vapor phase by heating isoborneol vapor and air at a temperature of from 170 to 180° C. for from three to eight hours in the presence of copper or an inert substance, such as earthenware. The action of the copper in this case, as in other gas reactions involving organic substances, is that of a dehydrogenation catalyst.

In seeking to improve upon the vapor phase oxidation of borneol and of isoborneol, either of which may be referred to generically as a borneol, we have found that a remarkable decrease in reaction time as compared with the process of the above-mentioned patent, as well as a better yield, is attained by bringing borneol or isoborneol vapor mixed with an oxygen-containing gas such as oxygen or air, in contact with oxides of vanadium, molybdenum, or chromium at temperatures ranging from 200 to 600° C. These oxides act as true oxidation catalysts and are sharply distinguished in this respect from dehydrogenation catalysts such as copper.

To make clear the difference in the reaction times of the present process and of the old vapor phase process, it may be said that in the process of the present case a yield of more than 20% camphor is obtained when a given portion, such as one cubic centimeter, of the air-vapor mixture is maintained in contact with vanadium oxide at a temperature of 300° C. for a few seconds (that is, less than a minute), as compared with a yield of about 6% camphor when the air-vapor mixture is maintained in contact with copper at the optimum temperature (175-177° C.) for three hours.

Our process may be illustrated by the following example:

Isoborneol vapor is mixed with air in the proportion of one gram of isoborneol to about one liter of air (measured at 20° C. and 760 mm. pressure), and the vapor mixture is passed into close contact with an oxidation catalyst at a temperature of from 275 to 325° C. The catalyst which we prefer is vanadic oxide either in a powdered form, or placed upon a carrier such as pumice, or in the fused condition. The vapor mixture leaving the catalyst is passed into a condenser where the camphor and any unchanged isoborneol are condensed and separated from the permanent gases. Some camphene is usually formed during the reaction and is separated at the same time.

The proportion of isoborneol to air which may be used is not limited to the proportion given in the above example, but may vary within wide limits. The ratio of air to isoborneol may for example be as low as ¼ liter of air to 1 gram of isoborneol, and as high as 20 liters of air to 1 gram of isoborneol; we prefer to use a proportion of air within the range of 0.5 to 10 liters for each gram of isoborneol.

As catalysts the oxides of molybdenum, and particularly molybdic anhydride, appear to be as satisfactory as the oxides of vanadium. Chromium oxides (for example, $Cr_2O_3$) can also be employed to advantage, although not as good a catalyst as the oxides of vanadium and molybdenum.

The yield of camphor is ordinarily 25% or more of the isoborneol initially present in the vapor mixture, this yield being increased by repassage over the catalyst of the isoborneol which remained unchanged in the first passage over said catalyst.

We claim:—

1. The process of making camphor which comprises subjecting isoborneol in the gaseous state mixed with air in the ratio of 1 gram of isoborneol to from about 0.5 to 10 liters of air, measured at 20° C. and 760 mm. pressure, to the action of an oxidation catalyst maintained at a temperature between 200 and 600° C.

2. The process of making camphor which comprises subjecting isoborneol in the gaseous state mixed with air in the ratio of 1 gram of isoborneol to from about 0.5 to 10 liters of air, measured at 20° C. and 760 mm. pressure, to the action of an oxidation catalyst maintained at a temperature between 200 and 600° C., the period of contact of any one cubic centimeter of the gas mixture with the catalytic surface being from a few seconds to about one minute.

3. The process of making camphor which comprises subjecting isoborneol in the gaseous state mixed with air in the ratio of 1 gram of isoborneol to from about 0.5 to 10 liters of air, measured at 20° C. and 760 mm. pressure, to the action of an oxide of vanadium maintained at a temperature between 200 and 600° C., the period of contact of any one cubic centimeter of the gas mixture with the catalytic surface being from a few seconds to about one minute.

In testimony whereof we affix our signatures.

HARRY D. GIBBS.
ALFRED W. FRANCIS.